United States Patent [19]

Guibord et al.

[11] 4,308,804
[45] Jan. 5, 1982

[54] AUTOMATIC CASH DEPOSITORY

[75] Inventors: Ronald D. Guibord, Boylston; Robert G. Yetman, Carlisle; Richard G. Harris, Franklin, all of Mass.

[73] Assignee: Honeywell Information Systems Inc., Waltham, Mass.

[21] Appl. No.: 92,525

[22] Filed: Nov. 8, 1979

[51] Int. Cl.³ .......................... G01D 9/00; E05G 1/00; G06F 15/30
[52] U.S. Cl. .................................. 109/24.1; 235/379; 364/408
[58] Field of Search .................. 109/24.1; 232/44, 47; 346/22

[56] References Cited

U.S. PATENT DOCUMENTS

| 3,078,789 | 2/1963 | McGee | 109/24.1 |
| 3,611,293 | 10/1971 | Constable | 340/149 A |
| 3,641,497 | 2/1972 | Constable | 340/149 A |
| 3,778,595 | 12/1973 | Hatanaka | 340/149 A |
| 3,836,980 | 9/1974 | Grosswiller | 232/44 |
| 3,897,901 | 8/1975 | Grosswiller | 109/24.1 |
| 3,942,435 | 3/1976 | Aultz | 346/22 |
| 3,982,103 | 9/1976 | Goldman | 340/149 A |
| 4,038,523 | 7/1977 | Widmer | 109/24.1 |
| 4,075,460 | 2/1978 | Gorgens | 340/149 A |
| 4,085,687 | 4/1978 | Beck | 109/24.1 |
| 4,134,537 | 1/1979 | Glasser | 235/379 |

*Primary Examiner*—Reinaldo P. Machado
*Attorney, Agent, or Firm*—Nicholas Prasinos; Gerald E. Lester

[57] ABSTRACT

An automatic cash depository having a tiltable feeding mechanism which receives an inserted deposit envelope and delivers it to a collection bin. Controls are provided for maintaining the feeding mechanism in a first position representing a blind feed path which does not present access to the collection bin. After the deposit envelope has fully entered the feeding mechanism and the insertion slot has been closed by a rotatable bolt closure, the control tilts the feeding mechanism and causes the envelope to be delivered to the collection bin.

11 Claims, 7 Drawing Figures

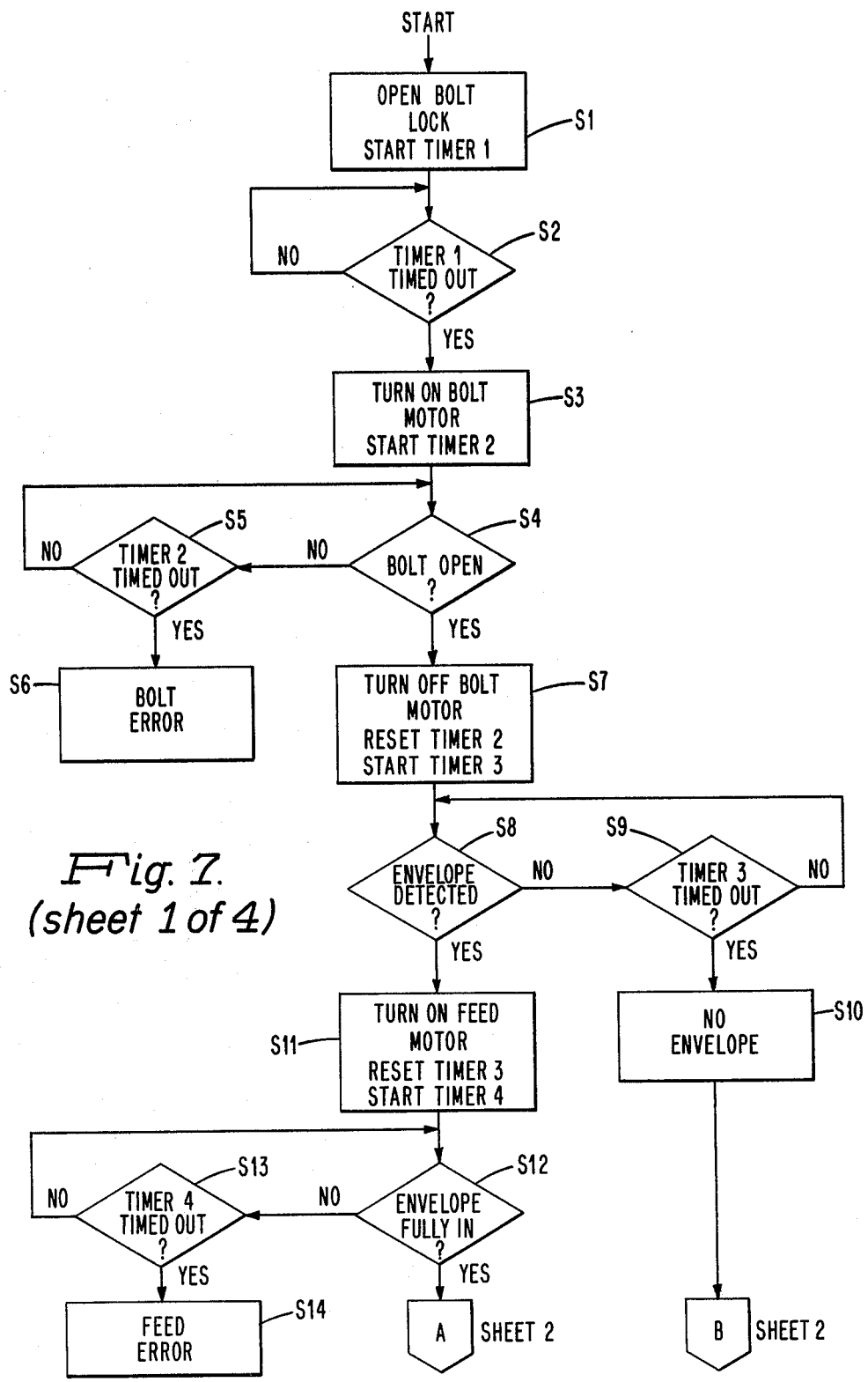
Fig. 7. (sheet 1 of 4)

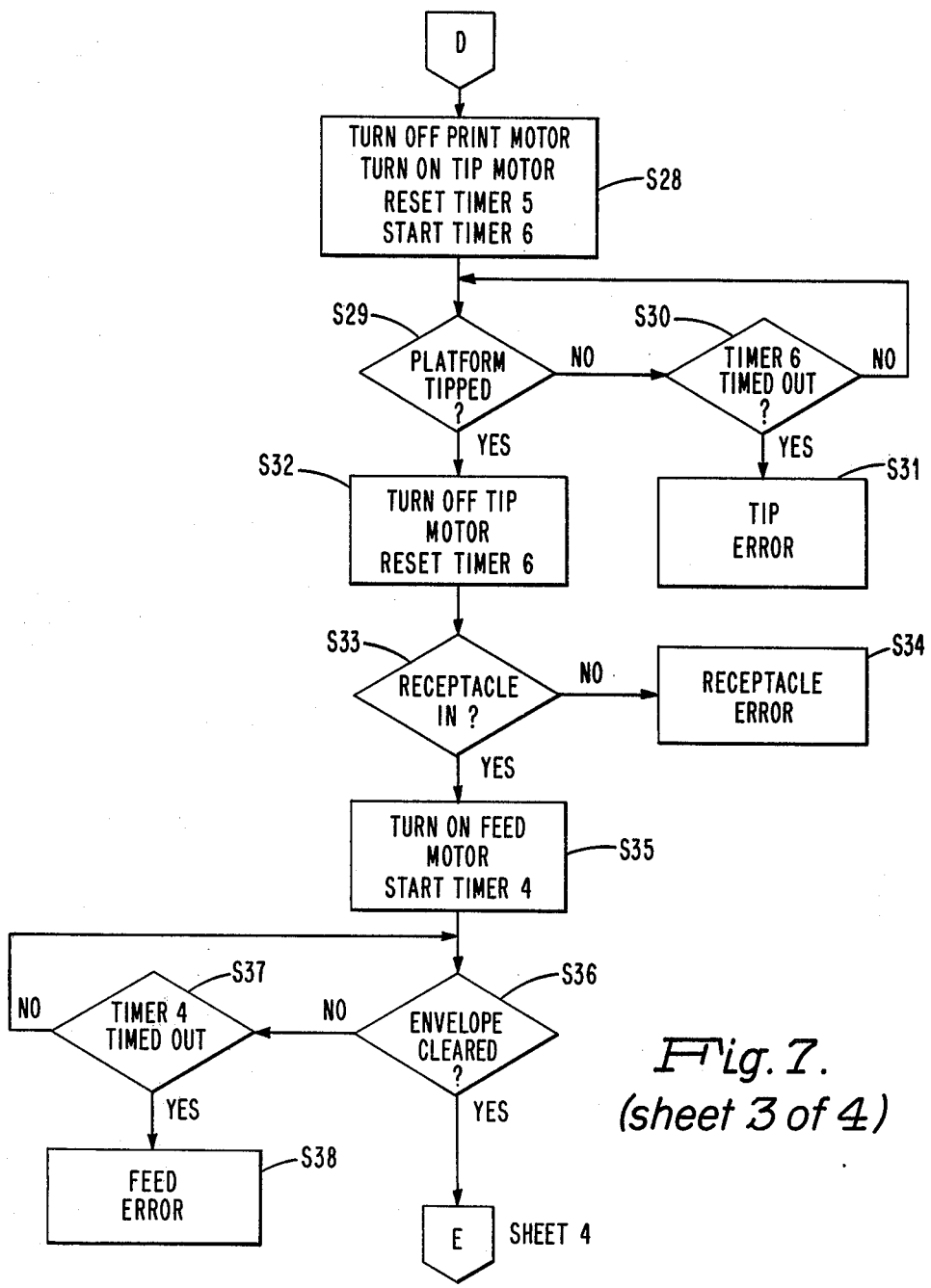
Fig. 7. (sheet 3 of 4)

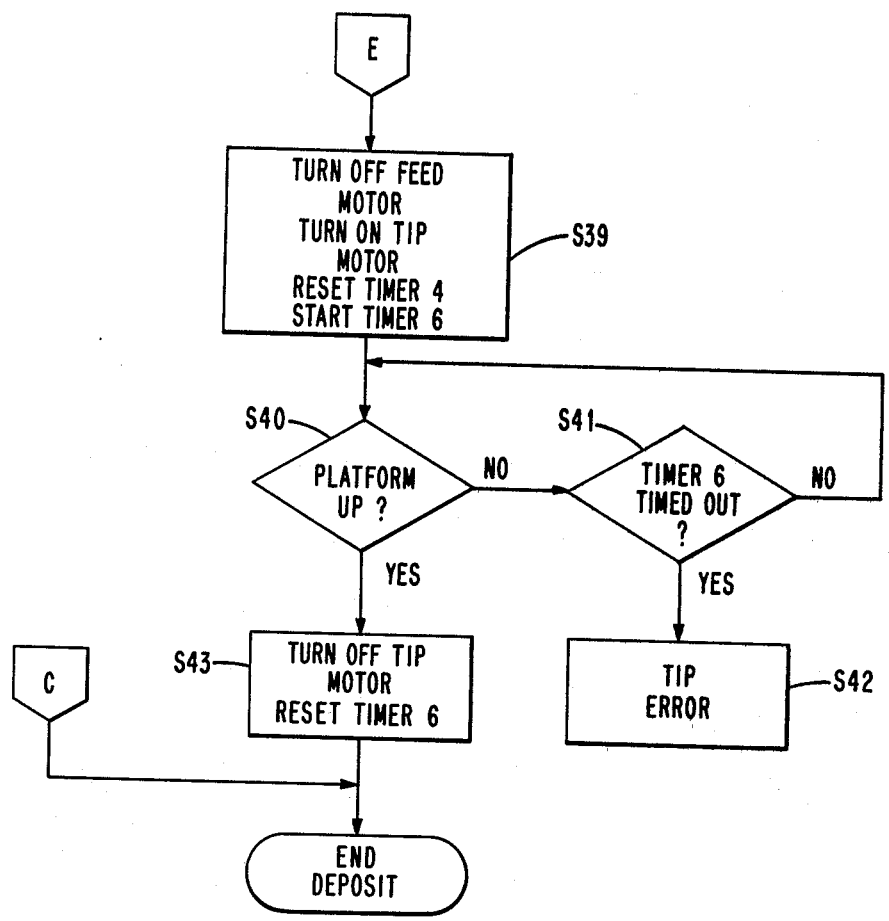
Fig. 7. (sheet 4 of 4)

AUTOMATIC CASH DEPOSITORY

FIELD OF THE INVENTION

This invention pertains to automatic banking systems, and more particularly, to an automatic cash depository system having anti-tampering means.

BACKGROUND OF THE INVENTION

Banking systems employing automatic transaction terminals for handling cash dispensing and depository requests are being increasingly employed by banks and other financial service organizations as a means for reducing labor expense and providing extended banking hours and enhanced convenience to customers.

In handling deposit transactions in which a customer enters an envelope or other deposit container into the terminal, difficulties have been encountered with the depository apparatus in these systems in that the physical opening which necessarily must be provided into the system for the purpose of entering deposit containers can be used for inserting probes and other devices into the confines of the terminal safe. This leads to fouling of the mechanism and can also result in theft of stored deposit containers.

OBJECTS AND SUMMARY OF THE INVENTION

Accordingly, it is an object of the present invention to provide an improved depository system for an automatic banking terminal.

A further object is to provide an improved depository system having anti-tampering means which prevent the removal of existing deposits through the deposit slot from outside the system.

To achieve the foregoing objects and in accordance with a first aspect of the invention, a deposit system is provided including an operator panel having means for permitting an operator to make a deposit request, deposit means adjacent the operator panel for receiving a deposit container inserted by the operator, transport means including a feed platform and feed rolls mounted thereon for guiding and feeding the container along a blind entrance path, first sensing means for indicating when a container has been inserted into the deposit means, drive means operating in response to the first sensing means for rotating the feed rolls to feed an inserted container across the platform and along the entrance path, second sensing means for generating a position signal when the container reaches a predetermined position on the entrance path, and shift means responsive to the position signal for shifting the transport means to guide and feed the container along an exit path different from, and not aligned with, the entrance path, whereby the container is delivered to a deposit receptacle.

In accordance with another aspect of the invention, there is further provided gate means for closing the deposit means to block access thereto after a deposit container has been inserted, and control means for inhibiting the operation of the shift means in the event the gate means fails to close the deposit means.

The accompanying drawings which are incorporated in and constitute a part of this specification, illustrate a preferred embodiment of the invention and together with the description serve to explain the principles of the invention.

DETAILED DESCRIPTION OF EMBODIMENT

Figure 1:
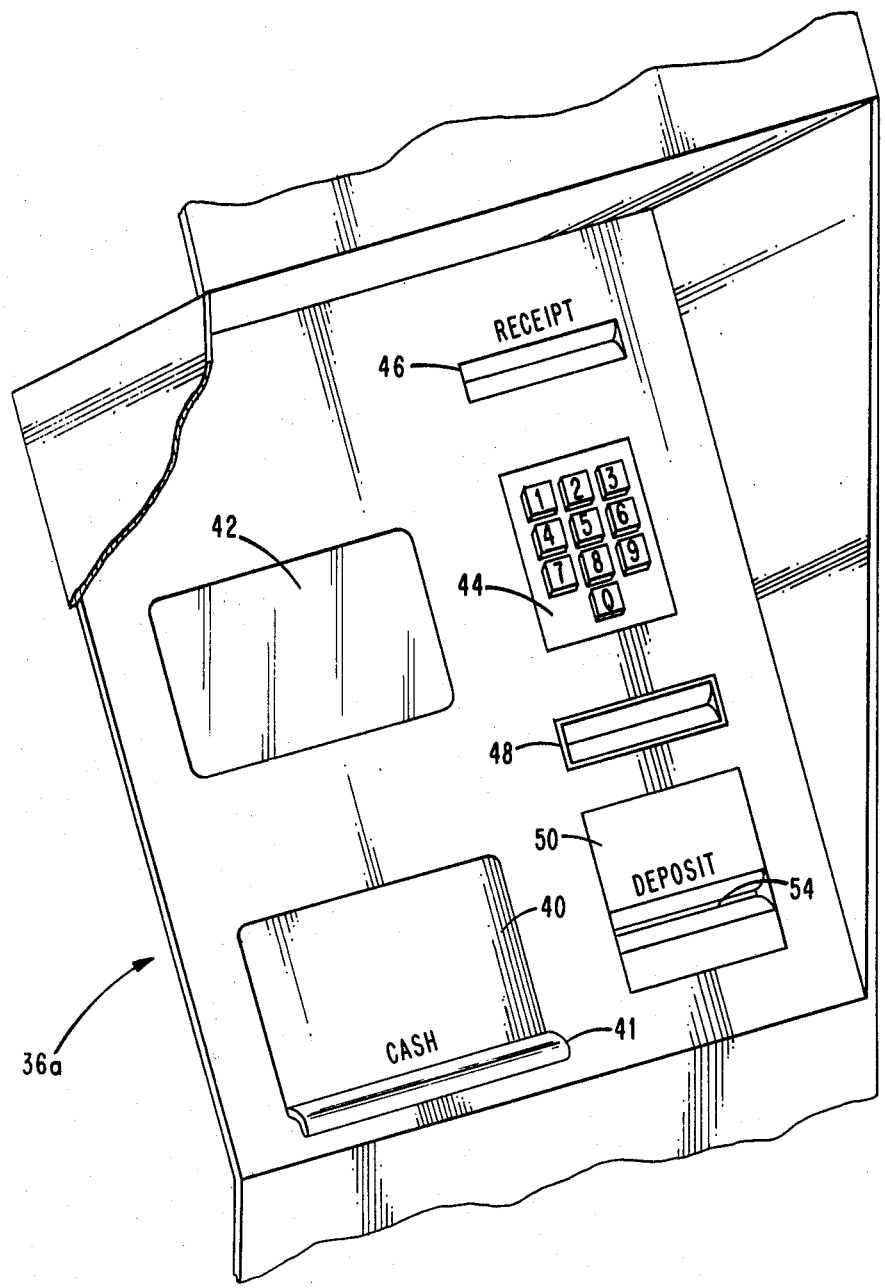
FIG. 1 is a perspective view, partially sectioned, of the customer or operator's panel which permits the operator to make a deposit request and to enter a deposit container into the system.

FIG. 1 shows the operator panel 36a which forms the customer or operator interface for the system of the invention. The panel includes a cash or note access door 40 which may be actuated by the operator by raising handle 41 to gain access to a note dispensing chamber to remove cash dispensed therein by the system. An instruction screen 42, e.g., the face of a cathode ray tube (CRT), is controlled by the system to display step-by-step instructions for walking the operator through each transaction. A 10-key keyboard 44 provided on the panel 36a enables the operator to enter data which is required to request and complete the transaction. A slot 46 is provided for presenting a transaction receipt to the customer for those transactions which require a receipt. A further slot 48 is provided to enable the operator to insert his personnal identification card into the panel, enabling a card reader located behind the panel to read the data on the card and feed it to the system in accordance with known system operation procedures. The operator panel also includes a depository station 50 including a deposit slot 54 for receiving an envelope or other deposit container inserted by the operator during a deposit transaction.

In general, to operate the system, the operator inserts an identification card, which includes magnetically encoded data uniquely identifying the operator, into slot 48 of the operator's panel. The card reader alerts the system to the upcoming transaction and feeds the data on the card to the system to identify the operator. Thereafter, instructions are displayed on the screen 42 and the operator responds thereto by keying in his personnel identification number (PIN) via keyboard 44. The PIN is compared with the data on the identification card to validate to transaction request. Thereafter the operator utilizes the keyboard 44 to inform the system of the type of transaction desired, the amount involved, etc. When the transaction involves the delivery of cash, the system causes notes to be dispensed into the dispensing chamber located behind access door 40 and, when signalled by the system, the operator opens the door and removes the cash.

Figure 2:
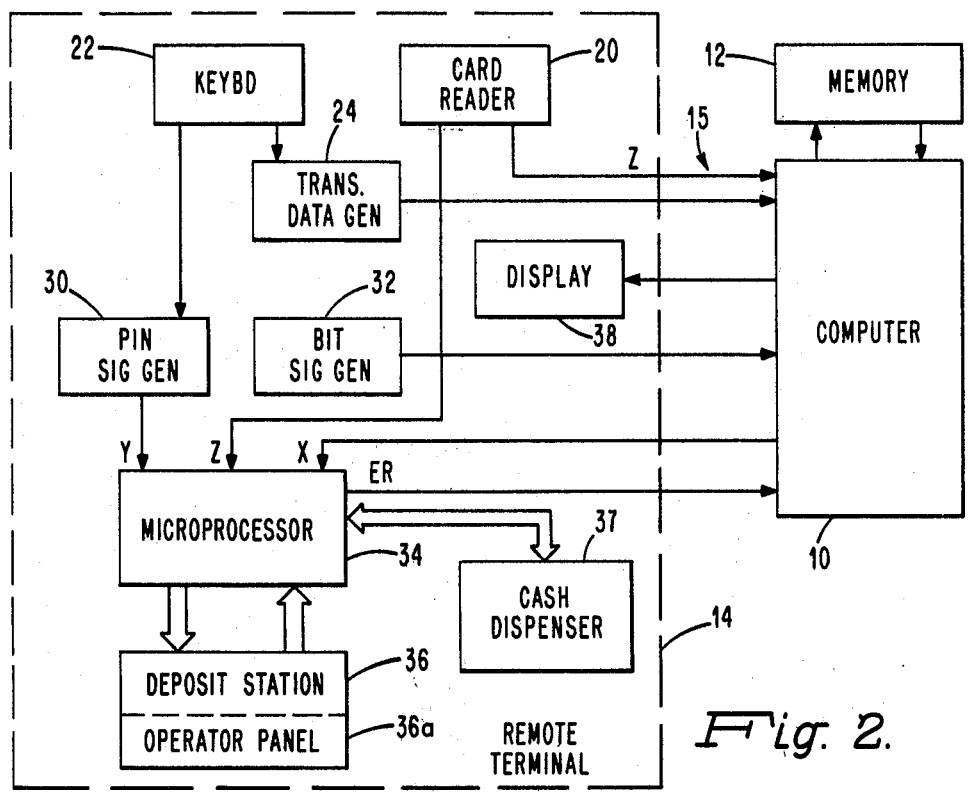
FIG. 2 is a schematic block diagram of a banking system employing a cash depository system in accordance with the present invention.

A general block diagram of the overall system is shown in FIG. 2. The structure and operation of the system insofar as a cash dispensing operation is concerned is described in detail in U.S. Pat. No. 4,075,460, issued to Richard A. Gorgens, which is incorporated herein by reference. In general, the system comprises a centralized computer 10 and memory unit 12 which is in communication via data lines 15 with a remote terminal 14 including a cash deposit station 36 and operator panel 36a. PIN data keyed into keyboard 22 by the operator is fed to a PIN signal generator 30 to generate a signal representative of a series of numbers entered by the operator, which signal is denoted by reference character Y.

A BIT signal generator 32 is responsive to PIN signal generator 30 to generate a signal representative of the number of bits in the PIN signal Y. The BIT signal is transferred via one of the lines 15 to the computer 10. A transaction data generator 24 encodes transaction data entered into keyboard 22 and transmits it to the computer 10 via the lines 15. The magnetic card reader 20, which reads the data from the customer identification card inserted into slot 48 (FIG. 1), transmits the card data signal Z to the computer. The computer controls the display device 38 to display operator instructions appropriate to the type of transaction.

A security device, for example, microprocessor 34, receives the Y and Z signals from the signal generator 30 and card reader 20, respectively, and in addition receives an X signal from the computer 10 and, upon appropriate validation of all three signals as described in U.S. Pat. No. 4,075,460, issues a transaction start signal to the cash deposit apparatus 36. This initiates a deposit operation for enabling the operator to enter a deposit container such as an envelope into the deposit slot 54 in operator panel 36a. The system may likewise issue a cash dispense signal to module 37 to initiate a cash dispensing operation.

Figure 3:
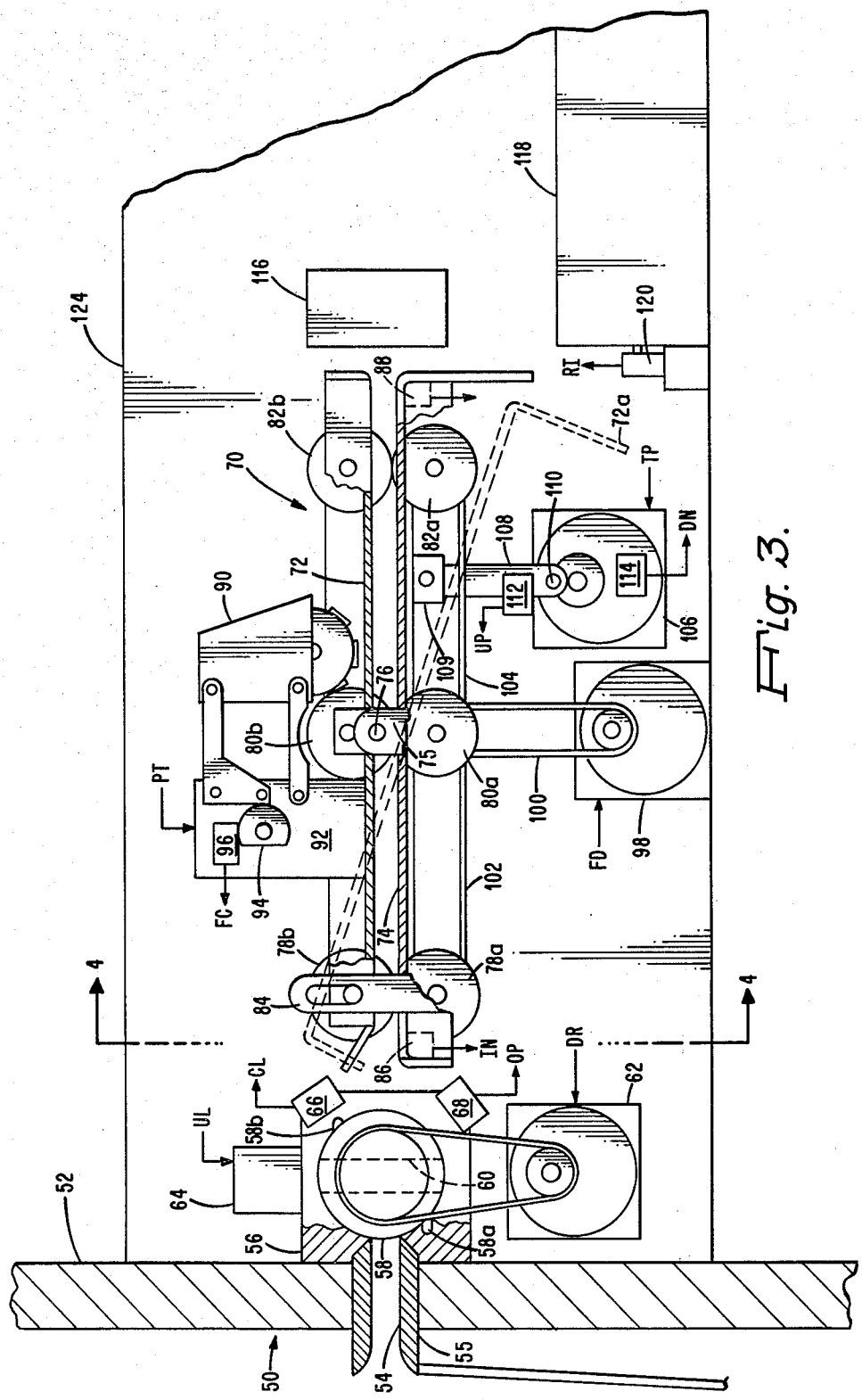
FIG. 3 is a side elevation view, partially sectioned, showing the mechanical portion of the depository system of the invention.
Figure 5:
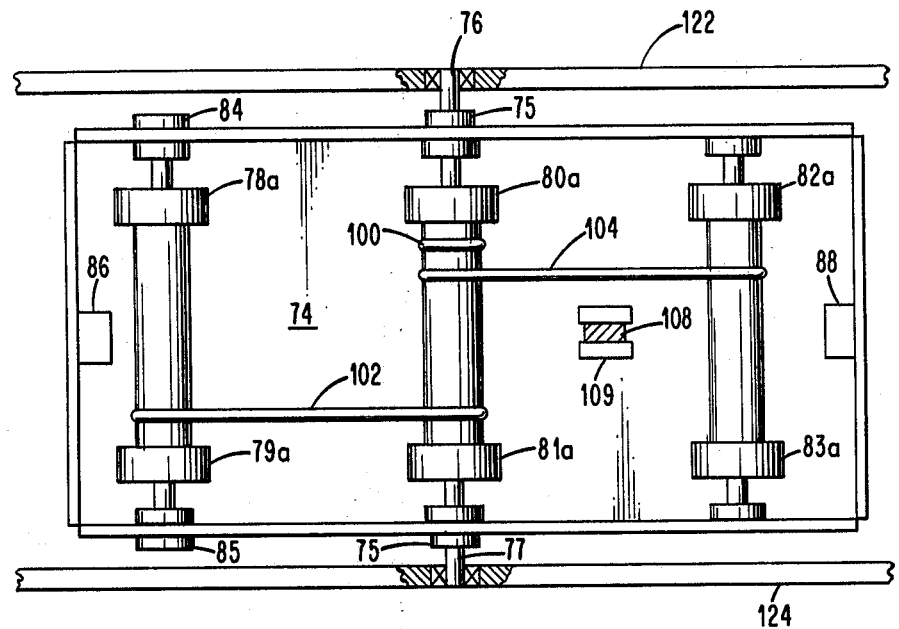
FIG. 5 is a bottom view, partially sectioned, showing the underside of the transport platform assembly of the system.
Figure 4:
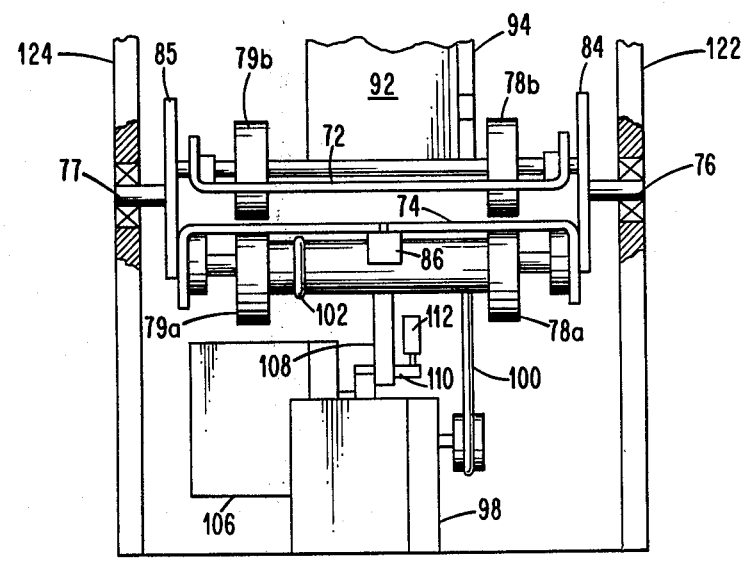
FIG. 4 is a cross-sectioned view taken along the line IV—IV of FIG. 3.

FIGS. 3, 4, and 5 illustrate the mechanical portion of the cash depository system of the invention. The apparatus is located within the confines of the terminal safe, the front wall of the safe being shown at 52 in FIG. 3. The apparatus is contained within a module comprising a pair of parallel sidewalls 124 and 122 (FIGS. 4 and 5). The deposit slot 54 is provided within a projection 55 extending from a block 56 located against the inside of the safe wall 52.

Block 56 is provided with a cylindrical opening which has its axis running across the width of slot 54. A continuation of the slot 54 is provided in block 56 on the opposite side of the cylindrical opening therein to permit a deposit envelope to pass through the block 56. A cylindrical bolt member 58 fits within the cylindrical opening in the block and is rotated therein by a drive motor 62 and a belt and pulley drive arrangement. The bolt 58 is provided with a slot 60 which aligns with the slot 54 when the bolt is rotated to a predetermined angular position. A solenoid actuated locking device 64 has a pin which engages a latching notch in the periphery of bolt 58 when it is either in the position shown in FIG. 3 or when it is 180° displaced therefrom The pin may be gravity or spring-biased into the locking position when the solenoid activation signal UL is not present. This positively locks bolt 58 and prevents it from being rotated to the open position by an instrument inserted through slot 54.

A pair of lugs 58a and 58b are provided on the periphery of bolt 58 at one end thereof and engage a pair of sensing switches, e.g., microswitches, 66 and 68. Microswitch 66 generates a signal CL when either of the lugs actuates the switch. This signals that the bolt is in the closed position. When microswitch 68 is activated by either of the lugs, a signal OP is generated, signalling the system that the bolt is in the open position. Drive motor 62 is energized by a drive signal DR supplied by the microprocessor 34 in a manner to be described hereinafter.

The system further employs a transport platform mechanism 70 which is pivotally supported between the sidewalls 124 and 122 of the depository module. The platform 70 comprises a pair of U-shaped plates 72 and 74 which are positioned in back-to-back fashion as shown in FIG. 4. Pivot pins 76 and 77 are fixed to a pair of projections or tabs 75 which are mounted on the side flanges of the lower plate 74 (FIGS. 3 and 5).

Each of the plates 72 and 74 is provided with three pairs of feed rolls which project through slots in the plates and operate to transport a deposit envelope inserted through entrance slot 54 along a left-to-right path (relative to FIG. 3). The feed rolls 78a–83a in lower plate 74 (FIG. 5) are driven by a feed motor 98 via a set of O-ring belts 100, 102, and 104. Feed motor 98 is activated by a signal FD supplied by microprocessor 34. Belt 100 couples the motion from the gear-reduced output of motor 98 to the center pair of driven feed rolls 80a and 81a. All six pairs of feed rolls are rotatably mounted on axle shafts which are retained in support members (not numbered) fixed to the side flanges of the plates 72 and 74. As shown in FIG. 5, the drive belts 100, 102, and 104 are trained about grooved spindles which interconnect the three pairs of lower feed rolls. The rotation which is coupled by belt 100 to the center rolls 80a, 81a is transferred to the rolls 82a, 83a located at the exit end of the plate 74 by belt 104. Feed rolls 78a, and 79a located at the input end of the plate 74 are driven by belt 102 from the center feed rolls.

The three pairs of upper rolls 78b–83b rotatably mounted in plate 72 align with the lower rolls and provide drive pressure to force a deposit envelope against the lower rolls to provide a left-to-right feeding action. The upper plate 72 is connected to the lower plate 74 only by the end portions of the axle shafts extending from rolls 78b and 79b. The end sections of the axle shafts extend through the axle supports and slide flanges of plate 72, as shown in FIG. 4, and are retained in a pair of slotted projections 84 and 85 extending upwardingly from the side flanges of the lower plate 74. Appropriate shims or bushings (not shown in FIG. 4) should be provided between the projections 84 and 85 and the side flanges of plate 72 to prevent the latter from shifting laterally with respect to the plate 74. The weight of the upper plate, including the mechanism mounted on it, is sufficient to provide the desired amount of feed pressure to cause deposit envelopes to be driven by the action of the lower feed rolls. At the same time, the upper plate 72 is allowed to float vertically due to the play permitted by the slots in projections 84 and 85, whereupon deposit envelopes of different thicknesses may be readily accommodated.

A printing mechanism is mounted on upper plate 72. The printer includes a numbering stamp 90 which is pivotally supported on a mounting frame 92 fixed to plate 72. The numbering stamp 90 is hinged by two sets of parallel link members. This allows printer 90 to be lowered during the printing stroke without being tilted, whereby a suitable print impression is produced. A motor provided in frame 92 rotates a cam 94 so that when the flat on the cam comes into contact with the follower arm, tension springs (not shown) connected to stamp 90 drive the latter downwardly in a printing stroke against the upper surface of the deposit envelope through an opening in the plate 72. The printer motor is activated by a signal PT supplied by microprocessor 34 and a microswitch 96 is operated by a lug on the motor shaft so that a signal PC is generated each time the printer motor rotates the cam 94 through 360°, indicating that a print stroke has been executed. Alternatively, an eccentric roller cam may be used in place of the flat-type cam shown.

A photo-optical sensor 86 is provided at the input end of the plate 74 and a second photo-optical sensor 88 is provided at the exit end thereof. Sensor 86 generates an output signal IN whenever a deposit envelope inserted through slot 54 overlies the sensor. The latter may be any conventional reflective or transmissive photo-optical sensing module. A reflective unit may operate, for example, such that a beam of light projected from the module 86 passes through an aperture in plate 74 and is reflected from the surface of the envelope immediately above it. Reflected light is sensed through a sensing aperture located adjacent to the emitting aperture by a photo-diode or other sensing device within the unit 86. Output sensor 88 generates a clear signal CR when the leading edge of the inserted envelope is fed to a position such that it covers the sensing aperture associated with the unit 88. The signal CR indicates to the system that the inserted deposit envelope has cleared the input block 56, whereupon the bolt 58 may be closed and further functions of the system initiated.

A tipping mechanism including tipping motor 106 and link 108 is provided to tip the feed platform 70 from its horizontal position as shown in solid lines in FIG. 3 to the tilted position shown by the dashed lines 72a. The link 108 is pivotally connected to a bracket 109 provided on the underside of plate 74. A crank pin 110 is provided on the output shaft of motor 106 such that when the motor shaft is in the position shown in FIG. 3 the feed platform 70 is in its horizontal position. When motor 106 rotates the crank pin 110 through 180°, link 108 pulls the platform 70 down to its tipped position 72a. The motor 106 is activated by a signal TP provided from microprocessor 34. A pair of microswitches 112 and 114 are provided as shown in FIG. 3 to sense the upper and lower positions of the motor shaft. Microswitch 112 generates a signal UP when platform 70 is in its normal or horizontal position, and microswitch 114 generates a signal DN when the platform is in its down or tipped position.

A stop member 116 fixed between the sidewalls 122 and 124 of the depository module serves as a blocking member to prevent any object from being moved past the end of the feed platform 70 so long as the latter remains in it horizontal position. A deposit receptacle 118, such as a bin or tray, is positioned below stop member 116 and receives deposit envelopes during a deposit operation through the action of the system as described hereinbelow. A microswitch 120 is provided to sense the presence of tray 118 and to generate a signal RI to the microprocessor when the tray 118 is present and properly inserted.

Figure 6:
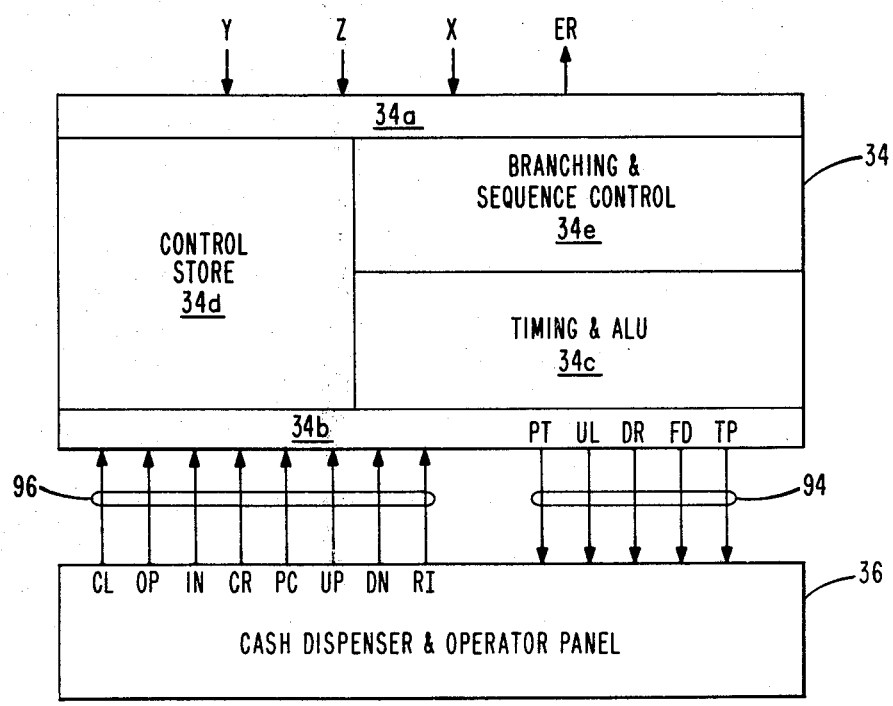
FIG. 6 is a schematic block diagram of the control microprocessor employed in the system to operate the depository apparatus.

FIG. 6 illustrates the microprocessor 34 and the interconnection thereof to the deposit station 36. The microprocessor 34 includes interface sections 34a and 34b, a timing and arithmetic logic unit 34c, a control store section 34d, and a branching and sequence control section 34e. The microprocessor may comprise, for example, a standard 8085 microprocessor chip module as manufactured by Intel Corporation. The microprocessor receives the X, Y, and Z signals from the computer 10, PIN signal generator 30 and card reader 20, respectively. The microprocessor generates an output signal ER which is transmitted to the computer 10 under certain error conditions indicating that the terminal 14 requires manual intervention by a bank employee to service a condition which the system cannot automatically handle.

When microprocessor 34 determines, in response to the X, Y, and Z signals that a deposit transaction is to be initiated, it transmits, in the appropriate sequence as determined by the control firmware stored in the microprocessor, signals via lines 94 to the deposit station 36 to control the operation of the deposit transaction. In turn, control signals are transmitted from the deposit station to the microprocessor via lines 96. The firmware in the microprocessor monitors these signals and executes the proper sequence of operations.

As has been described, the signals transmitted via lines 96 include the bolt close signal CL, the bolt open signal OP, the envelope in signal IN, the envelope clear signal CR, the print complete signal PC, the platform up signal UP, the platform down signal DN, and the receptacle in signal RI. The control signals generated by the microprocessor and transferred via lines 94 include the print signal PT, the unlock bolt signal UL, the bolt drive signal DR, the feed signal FD, and the tipping signal TP. Print signal PT energizes the print motor in frame 92 while the bolt unlock signal UL activates the solenoid 64 to withdraw the locking pin from the bolt 58. Bolt drive signal DR activates bolt motor 62 to rotate the bolt cylinder 58 90°. While the feed signal FD activates motor 98 to drive the feed rolls in the feed platform assembly 70. Tipping signal TP activates tipping motor 106, causing it to rotate crank pin 110 180°.

Control of the system for effecting a deposit operation is exercised by microinstructions stored in control store section 34d of the microprocessor 34. The microinstructions are represented by the flowchart diagram of FIG. 7.

OPERATION

Figure 7:
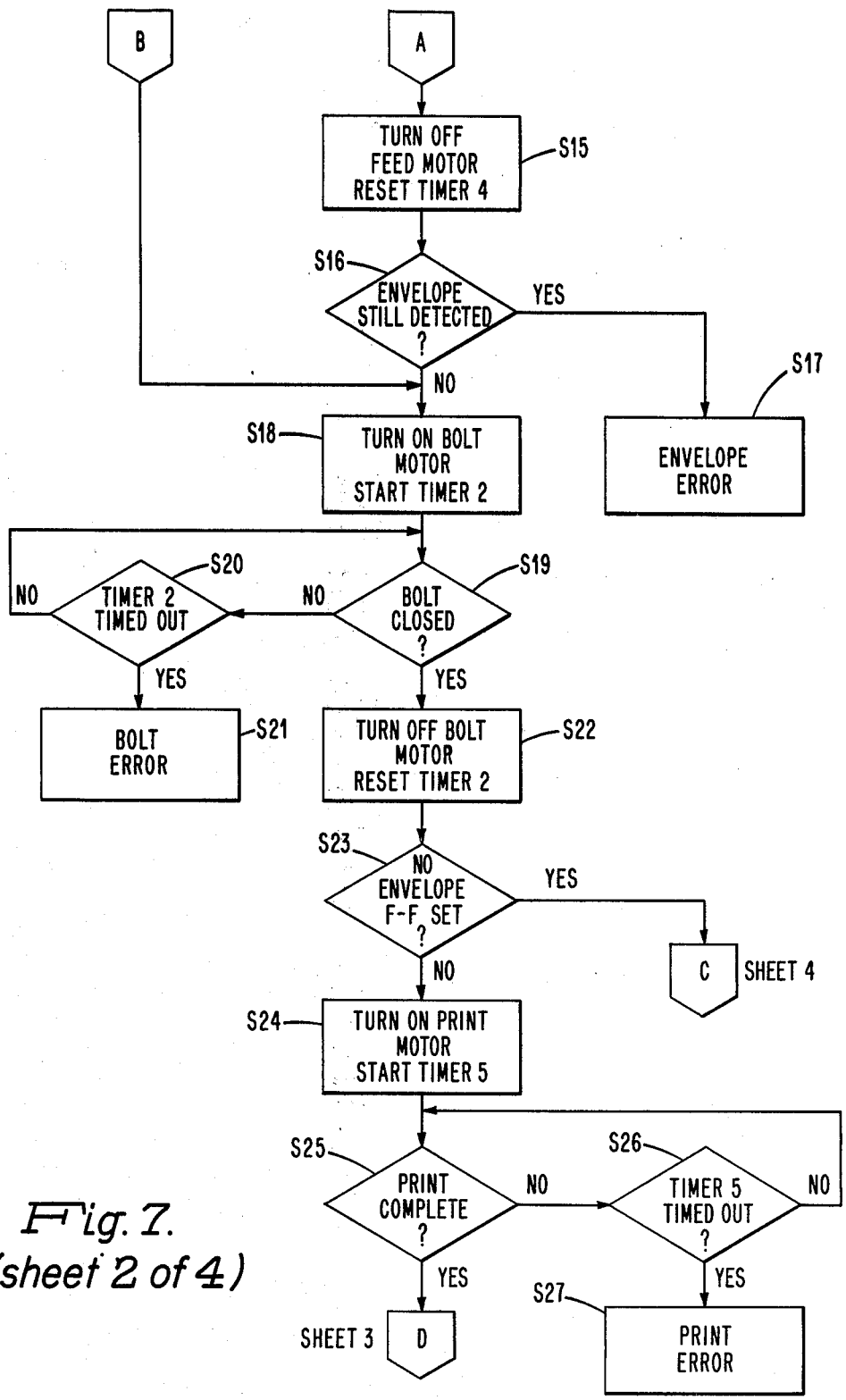
FIG. 7 illustrates, in four (4) sheets, a flowchart diagram depicting the control firmware stored in the microprocessor for operating the depository system of the present invention.

Referring to FIGS. 3 and 7, operation of the automatic deposit system of the invention is hereinafter described.

It can be assumed that prior to the initiation of a deposit operation, the apparatus is in the condition as shown in FIG. 3 with the bolt 58 closed and the feed platform 70 in its horizontal position with no deposit envelope on it. Thus, the only control signals which are active are CL, PC, UP, and RI. All other signals, including the motor drive signals DR, PT, FD, and TP are inactive.

When the microprocessor determines that a valid deposit transaction has been requested, the deposit routine is initiated at step S1 as shown in FIG. 7, sheet 1. This causes the microprocessor to issue the bolt unlock signal UL and to start a timer 1. The latter may be internally set up within microprocessor 34 and may comprise, for example, a counter register in the ALU. The timing interval established by timer 1 is selected to reflect the normal delay time required for the mechanical operation involved in withdrawing the bolt locking pin. Upon initiating the actions called for in program step S1, the program advances to branching step S2 which tests the condition of timer 1 until it has timed out, whereupon the program exits via the Y (yes) branch from step S2 and enters step S3. This step calls for the microprocessor to issue the signal DR to begin the bolt opening operation and to start timer 2. The DR signal turns on bolt motor 62 and begins rotating the bolt 58 in the clockwise direction (FIG. 3). The interval established by timer 2 represents the amount of time normally required to rotate bolt 58 through 90°.

The program then enters branching step S4 which tests the condition of the bolt open signal OP. The program initially exits step S4 through the N (no) branch to branching step S5, which tests the condition of timer 2. Steps S4 and S5 constitute a timing loop which is repeatedly traversed by the program until either the signal OP is generated, signalling the opening of the bolt, or the timer 2 times out. In the latter instance, the program exits step S5 through the Y branch and enters step S6, indicating that a bolt error has occurred and causing the microprocessor to generate the signal ER to the computer 10, advising of the error condition so that appropriate action can be taken. The computer responds to the error signal by entering an error routine which deactivates any active motor signals DR, PT, FD, or TP, inhibiting any further operation of the deposit system until the problem is located and corrected.

If the bolt opens normally, the program exits step S4 via the Y branch and enters step S7, whereupon the bolt motor 62 is turned off, timer 2 is reset, and a timer 3 is started. The interval established by timer 3 represents the period of time it would normally take an operator to respond to the instruction to insert a deposit envelope into the slot 54.

After step S7 the program enters another timing loop comprising the branching steps S8 and S9 which causes the system to wait for the anticipated operator action. Step S8 monitors the envelope in signal IN and step S9 monitors timer 3. If IN is generated before timer 3 times out, the program exits step S8 through the Y branch and enters step S11 which causes the microprocessor to issue signal FD, activating feed motor 98. Step S11 also resets timer 3 and starts a timer 4. If the IN signal had not been generated prior to the end of the interval established by timer 3, the program exits step S9 via the Y branch and executes no envelope step S10 which sets an envelope error flip-flop in the microprocessor and initiates a bolt closing operation via steps S18–S22, described subsequently.

Assuming normal insertion of a deposit envelope within the period of timer 3, the feed motor 98 is tunred on in step S11 and feeds the deposit envelope from left to right as shown in FIG. 3. Timer 4 allows a period of time for the transportation of the envelope from the input position to a position on feed platform 70 where the leading edge of the envelope is detected by sensor 88. The program advances to branching step S12 which tests for the output signal CR from sensor 88 and starts execution of a timing loop comprising steps S12 and S13. The latter step monitors the timer 4. If the leading edge of the envelope does not reach sensor 88 during the period of timer 4, the program exists via branch Y from step S13 and step S14 signals the error condition to the computer 10. If the deposit envelope does reach the sensor 88 normally, the program advances to step S15 (FIG. 7, sheet 2) whereupon the feed motor is turned off and timer 4 is reset.

The program next executes the step S16 which monitors for the continued presence of the signal IN from input sensor 86. If IN is still being generated, it indicates that the operator has either utilized a non-standard envelope which is too long or has inserted a second envelope immediately behind the first envelope. Either of these actions is unacceptable to the system and accordingly envelope error step S17 is executed to cause the microprocessor to issue the ER signal to the computer 10, initiating the previously described error routine which inhibits further operation of the depository apparatus. As is implied by the relative spacing between the sensors 86 and 88, the system requires the use of deposit envelopes which do not exceed a predetermined maximum length. A supply of proper envelopes is stored at or near the operator panel 36a for the use of customers desiring to execute deposit transactions.

Assuming that a proper sized envelope has been used and that only one envelope has been inserted, the program exits step S16 through the N branch and enters step S18 whereby the microprocessor issues the signal DR, turning on the bolt drive motor 62 which rotates bolt 58 clockwise toward the closed position. At the same time the program restarts timer 2 to time the bolt closing operation.

The program next advances to the timing loop including steps S19–S20 which monitors the condition of control signal CL (step S19) and the state of timer 2 (step S20) and if timer 2 times out before the bolt closes, the program exits step S20 via the Y branch and enters bolt error step S21, causing the microprocessor to issue the ER signal to the computer 10. However, if the bolt closes in normal fashion, the program exits step S19 via the Y branch and proceeds to step S22 whereupon the bolt motor 62 is turned off and timer 2 is reset.

Thereafter, the program enters branching step S23 and checks the no envelope flip-flop in the microprocessor and if the flip-flop is set, indicating that the no envelope step S10 had previously been executed, the program exits step S23 via the Y branch and proceeds directly to the end of the deposit routine (entrance point C, sheet 4). If the no envelope flip-flop is not set, the program takes the N exit from S23 and enters step S24, continuing the deposit sequence by causing the microprocessor to issue the signal PT, turning on the print motor. At the same time timer 5 is started and the program advances to the timing loop comprising branching steps S25 and S26.

In step S25 the print complete signal PC is monitored and in step S26 the state of timer 5 is tested such that in executing the timing loop the system exits via branch Y of step S25 if the printing cycle is completed before timer 5 times out. On the other hand, if the print cycle is not properly executed, the program exits step S26 via the Y branch and enters the print error step S27, whereupon the microprocessor issues the ER error signal to the computer.

Assuming successful completion of the print cycle, the program proceeds to step S28 (FIG. 7, sheet 3) which turns off the print motor and turns on the tipping motor 106 by causing the microprocessor to issue signal TP. At the same time, timer 5 is reset, timer 6 is started, and immediately thereafter the program enters the timing loop comprising steps S29 and S30. Step S29 tests the DN signal from microswitch 114 which is generated when the feed platform 70 reaches its lower position and step S30 tests the state of timer 6. The S29–S30 loop is traversed until timer 6 times out or until DN is generated. If the timer times out first the program exits step S30 via the Y branch and executes tip error step S31, signalling the computer 10 by issuing ER to initiate the error routine. If the tipping operation is performed normally, the program exits step S29 via the Y branch and enters step S32, turning off the tip motor and resetting timer 6.

Thereafter, assuming proper operation of the tipping mechanism, the program executes branching step S33 to test for the presence of the deposit receptacle 118. This is done by monitoring the signal RI in step S33. If RI is not present, program executes step S34 to generate a receptacle error indication to the computer 10. If the receptacle 118 is present and properly seated, the program exits step S33 via the Y branch and enters step S35, turning on the feed motor 98 by generation of the FD signal and restarting timer 4.

Immediately thereafter, the program enters the S36–S37 timing loop whereupon the CR signal from sensor 88 is monitored, as is the state of timer 4. If the deposit envelope is properly fed into the receptacle 118, the CR signal, which was active at the beginning of the timing sequence, will go inactive before timer 4 times out. If this does not occur, timer 4 times out and the program exits step S37 via the Y branch and feed error step S38 is executed, generating ER to the computer 10.

Assuming that the deposit envelope is properly cleared into the receptacle, the program advances via the Y branch of S36 to step S39, whereupon feed motor 98 is turned off and tip motor 106 is reactivated by generation of TP. Also, timer 4 is reset and timer 6 is restarted to time the operation of the tipping motor. This is done through execution of timing loop S40–S41, whereupon branching step S40 monitors the UP signal and step S41 monitors timer 6 such that if the feed platform 70 is returned by the tipping motor to its normal horizontal position before timer 6 times out, the program exits step S40 via the Y branch and enters step S43 to complete the deposit operation by turning off the tip motor and resetting timer 6. If the platform restoring operation malfunctions, timer 6 times out before UP is generated and the program exits step S41 via the Y branch and enters tip error step S42, signalling an error to the computer 10.

Thus, reviewing the above-described operation, it is seen that the depository system of the invention responds under control of microprocessor 34 to a valid deposit request by causing the bolt 58 to be opened to permit the insertion of a deposit envelope through the slot 54. Insertion of the envelope triggers sensor 86 which initiates operation of the feed rolls, transporting the envelope along an initial entrance path through the feed platform assembly 80 to an exit position which is signalled by sensor 88. This initial path is a blind due to the presence of stop 116, which prevents the insertion of any object into the area of receptacle 118.

When the photo-sensor 88 generates the CR signal, the envelope is halted and the system proceeds to close the bolt 58 and to execute a print cycle whereby a deposit code number is stamped on the envelope by numbering stamp 90. Thereafter, the feed platform 70 is shifted to its lower position shown by dashed lines 72a in FIG. 3, whereby an exit path is established which bypasses the fixed stop member 116 so that energization of the feed motor discharges the deposit envelope into the receptacle 118. Thereafter, to complete the deposit operation, the feed platform 70 is returned to its horizontal position. Thus, at all times when the bolt 58 is opened, the feed platform 70 is in its horizontal position and the path from the deposit slot 54 into the terminal safe is a blind path which is terminated by the fixed stop member 116. Any object inserted into the apparatus while the bolt is open will be blocked by stop 116 and the object cannot reach the area of the receptacle 118.

Thus, it is seen that in accordance with the invention described herein, a deposit system and method is provided having an operator panel including means for permitting an operator to make a deposit request and deposit means adjacent the operator panel for receiving a deposit container inserted by the operator. As illustrated in the exemplary embodiment hereinabove described, the operating panel is represented by the panel 36a and the means for allowing an operator to request a deposit operation is represented by, for example, the keyboard 22, data generator 24 and computer 10. The deposit means adjacent the operator panel is represented by the block 56 including bolt 58 and deposit slot 54. Bolt 58 may be viewed as a gate means for closing the deposit means.

Further in accordance with the invention the system incorporates transport means including a platform, feed rolls, and drive means therefor for executing the step of guiding and feeding the container along a blind entrance path and sensing means for indicating when a deposit container has been inserted and for generating a position signal when the container reaches a predetermined position on the entrance path. As illustrated in the exemplary embodiment hereinabove described, the transport means is represented by the feed platform assembly 70 including the associated feed rolls, drive means, and the microprocessor 34 including the portions of the control firmware therein which control the feed motor. The sensing means are represented by the photo-sensor 86 which generates the signal IN and photo-sensor 88 which generates the signal CR when the leading edge of the deposit envelope reaches the exit end of the feed platform.

Still further, the described invention incorporates shift means responsive to the position signal for performing the step of shifting the transport means to guide and feed the container along an exit path different from the entrance path, whereby the container is delivered to a deposit receptacle. As embodied in the exemplary apparatus hereinabove described, the shift means comprises the pivot supports 76 and 77, which pivotally secure the feed platform 70 to the sidewalls of the apparatus, as well as the motor 106 and associated elements, including portions of the control firmware, which operate to tip the platform 70 to its lower position, establishing the exit path, allowing the transport means to feed the deposit envelope into the deposit receptacle 118.

It will be apparent to those skilled in the art that various modifications and variations could be made to the embodiment of the invention as hereinabove described without departing from the spirit and scope of the invention.

What is claimed is:

1. A deposit system comprising, in combination:
an operator panel including means for permitting an operator to make a deposit request;
deposit means adjacent said operator panel for receiving a deposit container inserted by said operator;
transport means including a feed platform and feed rolls mounted thereon for guiding and feeding said container along a blind entrance path;

first sensing means for indicating when a container has been inserted into said deposit means;

drive means operating in response to said first sensing means for rotating said feed rolls to feed an inserted container across said platform and along said entrance path;

second sensing means for generating a position signal when said container reaches a predetermined position on said entrance path; and shift means responsive to said position signal for shifting said transport means to guide and feed said container along an exit path different from said entrance path, whereby said container is delivered to a deposit receptacle.

2. The system set forth in claim 1 wherein said deposit means comprises:

entrance means including a slot for receiving a deposit container;

bolt means for selectively blocking said slot;

control means for generating bolt operating signals for controlling said bolt; and actuating means for operating said bolt means in response to said signals, thereby opening and closing said entrance means to either permit or prevent insertion of a deposit container into said deposit means.

3. The system set forth in claim 2 wherein:

said entrance means comprises a slotted block having a cylindrical opening oriented with its axis lying across the width of said slot; and said bolt means comprises a cylindrical member rotatably positioned within said cylindrical opening and having a slot oriented to align with the slot in said block when said member is rotated to a predetermined angular position.

4. The system set forth in claim 3 wherein said actuating means comprises means for rotating said cylindrical member in response to said bolt operating signals.

5. The system set forth in claim 1 further comprising fixed stop means positioned adjacent the exit end of said feed platform to block any object passing beyond said platform along said entrance path.

6. The system set forth in claim 5 wherein said shift means comprises:

means for pivotally supporting said feed platform; and means for tipping said platform in response to said position signal to feed said container along said exit path past said stop means.

7. The system set forth in claim 2 wherein said shift means comprises:

inhibit means for inhibiting the shifting of said transport means until after said actuating means has operated said bolt means to close said entrance means.

8. The system set forth in claim 1 further comprising:

print means for printing an identification mark on said container when said container is positioned within said transport means.

9. The system set forth in claim 8 wherein said print means is operated in response to said position signal.

10. A deposit system comprising, in combination:

an operator panel including means for permitting an operator to make a deposit request;

deposit means adjacent said operator panel for receiving a deposit container inserted by said operator;

gate means for closing said deposit means to block access thereto after said container has been inserted;

transport means for guiding and feeding said container along a blind entrance path;

sensing means for generating a position signal when said container reaches a predetermined position on said entrance path;

shift means responsive to said position signal for shifting said transport means to guide and feed said container along an exit path different from said entrance path, whereby said container is delivered to a deposit receptacle; and control means for inhibiting the operation of said shift means in the event said gate means fails to close said deposit means.

11. The system set forth in claim 10 further comprising lock-out means for positively detenting said gate means in said closing position.

* * * * *